United States Patent
Sanefuji et al.

(10) Patent No.: US 6,833,099 B2
(45) Date of Patent: Dec. 21, 2004

(54) POLYVINYL ALCOHOL FILM AND POLARIZATION FILM

(75) Inventors: Toru Sanefuji, Saijo (JP); Satoru Fujita, Saijo (JP); Tsutomu Kawai, Osaka (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/851,127

(22) Filed: May 9, 2001

(65) Prior Publication Data

US 2002/0001700 A1 Jan. 3, 2002

(30) Foreign Application Priority Data

May 12, 2000 (JP) ......................................... 2000-140014

(51) Int. Cl.[7] .............................. B32B 31/08; B28B 3/20; C08J 5/00
(52) U.S. Cl. .............................. 264/176.1; 264/172.19; 264/331.15
(58) Field of Search .......................... 428/1.1, 220, 332, 428/337, 339, 411.1, 500, 923, 926; 264/165, 172.11, 172.19, 211.12, 40.1, 176.1, 331.15

(56) References Cited

U.S. PATENT DOCUMENTS

| 3,607,812 A | * | 9/1971 | Takigawa et al. ...... 260/29.6 B |
| 5,197,242 A | * | 3/1993 | Baughman et al. ........... 52/171 |
| 6,113,811 A | * | 9/2000 | Kausch et al. .............. 252/585 |
| 6,166,117 A |   | 12/2000 | Miyazaki |
| 6,337,369 B1 |   | 1/2002 | Isozaki |

FOREIGN PATENT DOCUMENTS

JP          6-138319          5/1994

* cited by examiner

Primary Examiner—Sheeba Ahmed
(74) Attorney, Agent, or Firm—Oblon, Spivak, McClelland, Maier & Neustadt, P.C.

(57) ABSTRACT

A polyvinyl alcohol film obtained by casting on drum, in which the variance in thickness along the TD direction of the film is 0.5 $\mu$m/mm or less, the thickness of the film is within the range of 20 to 150 $\mu$m, and the width of the film is at least 2 m.

5 Claims, No Drawings

POLYVINYL ALCOHOL FILM AND POLARIZATION FILM

BACKGROUND OF THE INVENTION

1. Field of the Invention

The present invention relates to a polyvinyl alcohol film which has uniform optical characteristic over large area and has large width, the polyvinyl alcohol film being suitable for use of a polarization film used in a liquid crystal display having large screen.

2. Description of the Prior Art

A polarizer having functions of transmission and shielding of light is a fundamental element of a liquid crystal display (LCD), together with a liquid crystal having a function of switching light. Applied fields of such an LCD have expanded from small apparatuses such as electronic calculators, wristwatches and the like in early days of its development, to, in the recent years, apparatuses in a wider range such as lap top personal computers, word processors, liquid crystal color projectors, navigation systems for automobiles, liquid crystal televisions, personal phones, indoor and outdoor measuring apparatuses and the like, which have relatively large display area, and there is a need for polarizers having uniform optical characteristic or performance over larger area than conventional products.

For obtaining a polarizer having general construction, a polyvinyl alcohol film (hereinafter, polyvinyl alcohol-based polymer is abbreviated as a "PVA", and a polyvinyl alcohol-based (polymer) film is abbreviated as a "PVA film", in some cases) is monoaxially stretched and dyed to produce a polarization film on both faces of which protective films such as a triacetic acid cellulose and the like are laminated. For obtaining uniformity of polarization characteristic, there are may important requirements such as use of a PVA film having uniform thickness, uniform dyeing of a dichroic dye, laminating without irregularities, and the like, and degree of uniformity of a PVA film which is a material used for the polarization film is an important factor.

As a method of producing a PVA film, there is industrially employed, for example, a method of casting on belt or drum in which a film material, which may contain an organic solvent and the like, containing PVA in the form of a solution or melted substance is fed onto a belt or drum heated, and dried to form a film.

In a method in which a film material containing PVA in the form of a solution or melted substance is discharged onto the belt or the drum and dried to form a film, it is difficult to obtain a film having uniform thickness. Naturally, thickness irregularities of a film are desired to be small, and the best choice is to have almost none of thickness irregularities, however, there are actually several problems. Namely, thickness irregularities have two items: large waviness containing unevenness in thickness over an area of a length within several cm to some tens cm along the TD direction (transverse direction), and local streaks caused by thickness irregularities occurring on a film over an area of a length within 1 mm.

The target of the present invention is concerned with the latter local streaks, wherein linear streaks (unevenness) may occur continuously along the MD direction (longitudinal direction) from a discharging portion or lip of a die with the lapse of time in discharging a film material from the die. Though this streak was not conventionally recognized as a problem, a problem has been found that with recent increase in screen size and increase in screen luminance of LCD, when a PVA film has streaks, a polarization film produced from this film shows color irregularity, leading to an optical defect. Conventionally, trials to solve thickness irregularities of a film have been made widely, and for example, Japanese Laid-open Patent Publication No. 6-138319 suggests a PVA film having small thickness irregularities. However, this suggestion has an object to solve large waviness containing unevenness in thickness over an area of a length within several cm to some tens cm along the TD direction, and substantially, no technologies directed to solve a local streak defect have been known to date.

On the other hand, with recent increase in screen size of LCD, optical films having a width of at least 2 m are required, however, for producing a film having a width of at least 2 m, it is necessary to connect belts along the MD direction in the case of the method of casting on belt. As a consequence, when a PVA film material is discharged onto a belt and dried, the product can not be used as an optical film in some cases, due to optical insufficiencies (ununiformity of refractive index, transmittance, crystallinity and the like) caused by local streaks on the connecting portion of belts.

An object of the present invention is to provide a PVA film which has uniform optical characteristic over in large area and has large width, the PVA film being suitable for use of a polarization film utilized in a liquid crystal display having large screen. The present inventors have intensively studied for attaining this object, and devised the present invention.

SUMMARY OF THE INVENTION

The above-mentioned object is accomplished by a PVA film wherein the film is obtained by casting on drum, and the variance in thickness along the TD direction of the film is 0.5 $\mu$m/mm or less, the thickness of the film is within the range of 20 to 150 $\mu$m, and the width of the film is at least 2 m. Here, "the variance in thickness along the TD direction of the film is 0.5 $\mu$m/mm or less" means a fact that when the thickness of a film is measured continuously along the TD direction (transverse direction defined in JIS K 6900) of a film and difference in the thickness of a film per 1 mm in length of any portion along the TD direction, this difference in thickness is 0.5 $\mu$m or less. According to the present invention, a PVA film having uniform optical characteristics over a large area is obtained.

DETAILED DESCRIPTION OF EMBODIMENTS OF THE INVENTION

The present invention will be illustrated in detail below.

As a polyvinyl alcohol polymer constituting a PVA film, there can be used those obtained by hydrolyzing a vinyl ester polymer obtained by polymerizing a vinyl ester monomer, to convert a vinyl ester unit into a vinyl alcohol unit. As the vinyl ester monomer, for example, vinyl formate, vinyl acetate, vinyl propionate, vinyl valerate, vinyl laurate, vinyl stearate, vinyl benzoate, vinyl pivalate, vinyl versatate, and the like are listed, and of them, vinyl acetate is preferably used.

In copolymerizing a vinyl ester monomer, if necessary, a copolymerizable monomer can also be copolymerized in an amount which does not lose the effect of the present invention (preferably 15 mol % or less, more preferably 5 mol % or less).

As the monomer which can be copolymerized with such a vinyl ester monomer, there are listed, for example, olefins having 3 to 30 carbon atoms such as ethylene, propylene, 1-butene, isobutene and the like; acrylic acid and salts thereof; acrylates such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, octadecyl acrylate and the like; methacrylic acid and salts thereof; methacrylates such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, octadecyl methacrylate and the like; acrylamide derivatives such as acrylamide, N-methylacrylamide, N-ethylacrylamide, N,N-dimethylacrylamide, diacetoneacrylamide, acrylamidepropanesulfonic acid and salts thereof, acrylamidepropyldimethylamine and salts thereof, N-methylolacrylamide and derivatives thereof and the like; methacrylamide derivatives such as methacrylamide, N-methylmethacrylamide, N-methyhnethacrylamide, methacrylamidepropanesulfonic acid and salts thereof, methacrylamidepropyldimethylamine and salts thereof, N-methylolmethacrylamide and derivatives thereof and the like; N-vinylamides such as N-vinylformamide, N-vinylacetamide, N-vinylpyrolidone and the like; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether and the like; nitriles such as acrylonitrile, methacrylonitrile and the like; vinyl halides such as vinyl chloride, vinylidene chloride, vinyl fluoride, vinylidene fluoride and the like; allyl compounds such as allyl acetate, allyl chloride and the like; maleic acid and salts or esters thereof; itaconic acid and salts or esters thereof; vinylsilyl compounds such as vinyltrimethoxysilane and the like; isopropenyl acetate, and the like.

The average polymerization degree of PVA constituting a PVA film is at least 500 from the standpoint of strength of a film, and more preferably at least 1000, further preferably at least 2000, particularly preferably at least 3500 from the standpoint of polarization characteristic. On the other hand, the upper limit of the degree of polymerization of PVA is preferably 8000 or less, particularly preferably 6000 or less from the standpoint of film formation property. When the average degree of polymerization is over 8000, yield in polymerizing a monomer does not increase, in some cases. The degree of polymerization (P) of PVA is measured according to JIS K 6726. Namely, PVA is re-hydrolyzed and purified, then, intrinsic viscosity [η] (unit: dL/g, L represents liter) is measured in water of 30° C., and P is calculated from the intrinsic viscosity according to the following formula.

$$P=([\eta]\times 10^3/8.29)^{(1/0.62)}$$

The degree of hydrolysis of PVA constituting a PVA film is preferably at least 90 mol %, more preferably at least 95 mol %, further preferably at least 98 mol % from the standpoint of endurance a polarization film. On the other hand, it is preferably 99.99 mol % or less from the standpoint of dyeing property of a film. The degree of hydrolysis referred to in the present specification represents a proportion of units actually hydrolyzed into vinyl alcohol units in units which can be converted into vinyl alcohol units by hydrolysis. The degree of hydrolysis of PVA was measured by a method described in JIS.

Polyhydric alcohol is preferably added as a plasticizer in producing a PVA film. Examples of the polyhydric alcohol include ethylene glycol, glycerin, propylene glycol, diethylene glycol, triethylene glycol, tetraethylene glycol, trimethylolpropane and the like, and one or more of them can be used. Among them, ethylene glycol and glycerin are suitably because of an effect of improving stretching property. The amount of polyhydric alcohol added is preferably from 1 to 30 parts by weight, more preferably from 3 to 25 parts by weight, particularly preferably from 5 to 20 parts by weight, based on 100 parts by weight of PVA. When the addition amount is less than 1 part by weight, dyeing property and stretching property may decrease, and when over 30 parts by weight, a film may become too soft, leading to reduction in handling.

In producing a PVA film, it is preferable to add a surfactant. A surfactant is usually added for improving peeling property of a PVA film from a drum or belt after a PVA film materials is discharged on a drum or a belt and dried, and use of a specific nonionic surfactant is a preferable embodiment since this surfactant has an effect of suppressing local streaks. The nonionic surfactant which can be used for this object is a surfactant containing, carbon C, oxygen O, hydrogen H and nitrogen N, and specific examples thereof include alkyl ether-type nonionic surfactants such as polyoxyethylene lauryl ether, polyoxyethylene oleyl ether and the like, alkylphenyl ether-type nonionic surfactants such as polyoxyethylene octylphenyl ether and the like, alkyl ester-type nonionic surfactants such as polyoxyethylene laurate and the like, alkylamine-type nonionic surfactants such as polyoxyethylene laurylamino ether and the like, alkylamide-type nonionic surfactants such as polyoxyethylene lauric amide and the like, polypropylene glycol ether-type nonionic surfactants such as polyoxyethylene polyoxypropylene ether and the like, alkanolamide-type nonionic surfactants such as lauric acid diethanol amide, oleic acid diethanol amide and the like, allylphenyl ether-type nonionic surfactants such as polyoxyalkylene allylphenyl ether and the like.

When the above-mentioned nonionic surfactant is used, an anionic surfactant may be used without problem. An anionic surfactant preferably contains potassium K, sodium Na, sulfur S, nitrogen N and the like, and specific examples thereof include carboxylic acid-type anionic surfactants such as potassium laurate and the like, sulfate-type anionic surfactants such as octyl sulfate and the like, and sulfonic acid-type anionic surfactants such as dodecylbenzenesulfonate and the like. These surfactants can be used alone or in combination of two or more.

The amount of the surfactant added is preferably from 0.01 to 2 parts by weight, more preferably from 0.02 to 1 part by weight, and particularly preferably from 0.05 to 0.5 parts by weight, based on 100 parts by weight of PVA. When the addition amount is less than 0.01 part by weight, peeling property from a drum or belt may lower and local streak defect may occur. When the addition amount is over 2 parts by weight, the surfactant may be eluted on the surface of a film, causing blocking, and a lump of the surfactant may exist in a film, causing a defect of the film, to decrease optical characteristics.

The volatile component factor of a film material containing PVA used in producing a PVA film is preferably from 50 to 90% by weight, further preferably from 55 to 80% by weight. When the volatile component factor is less than 50% by weight, viscosity increases, consequently, uniformity of thickness along the TD direction of a film is lost and pressure increases, and film formation may become difficult. On the other hand, when the volatile component factor is over 90% by weight, viscosity becomes too low, and uniformity of thickness along the TD direction of a film may be lost.

As the metal material constituting a drum used in the present invention, for example, nickel, chromium, copper, stainless steel and the like are listed, and metal materials giving drum surface which is not corroded easily and manifests specular gloss are preferable. For enhancing endurance of a drum, a nickel layer, chromium layer or nickel/chromium layer may be plated alone or in combination of two or more on the surface of a drum.

The method of casting on drum referred to in the present invention is a method in which a film material in the form of a solution or melted substance is fed onto a metal drum (roll) rotating having a diameter preferably from 1 to 5 m, and volatile components contained such as water, organic solvent and the like are evaporated to dry the material on the drum (roll), to form a film. Subsequently, a film is stripped by a peeling roll, and further, the film is dried or humidity of the film is controlled to give a suitable film.

As the die for producing a PVA film, dies of choke bar method, flexible lip method and the like can be used. Among them, use of a die of flexible lip method integrally molded and having no residence portion is preferable, particularly since a PVA film having small local variance (irregularity) in thickness along the TD direction of a film is obtained.

The variance in thickness per unit mm length along the TD direction (transverse direction defined in JIS K 6900) of a film, referred to in the present invention, represents a local variance (irregularity) in thickness of a film, and this variance in thickness is 0.5 $\mu$m/mm or less, and preferably 0.28 $\mu$m/mm or less. When the variance in thickness is over 0.5 $\mu$m/mm, longitudinal streaks continuous along the MD direction (longitudinal direction defined in JIS K 6900) becomes remarkable, and resultantly, when the film is made into a polarization film, the above-mentioned streaks appear as longitudinal streaks having different densities thereby lowering quality. Therefore, for producing a polarization film having uniform optical characteristics, it is very important to use a PVA film having as few streaks as possible, namely, a PVA film having a variance in thickness along the TD direction of 0.5 $\mu$m/mm or less.

The average thickness of a PVA film is from 20 to 150 $\mu$m, preferably from 40 to 120 $\mu$m. When the average thickness is less than 20 $\mu$m, stretching break occurs in monoaxial stretching in producing a polarization film. On the other hand, when the average thickness is over 150 $\mu$m, stretching irregularity occurs in monoaxial stretching in producing a polarization film. The width of a PVA film of the present invention is at least 2 m, and preferably at least 2.3 m, more preferably at least 2.6 m, further preferably at least 3 m, and particularly preferably at least 3.5 m. When the width is less than 2 m, an influence of neck-in (contraction along the width direction) in monoaxial stretching tends to be exerted also on portions near the film center portion, and a polarization film which has wide width and uniform optical characteristics can not obtained. When the width is over 6 m, uniform stretching by monoaxial stretching in producing a polarization film may become difficult, therefore, the width of a film is preferably 6 m or less, more preferably 5 m or less, further preferably 4 m or less.

For producing a polarization film from the polyvinyl alcohol film of the present invention, for example, the PVA film may advantageously be subjected to dyeing, monoaxial stretching, fixing treatment, drying treatment, further if necessary, heat treatment. The order of these processes is not particularly restricted, and two processes such as dyeing and monoaxial stretching and the like may be conducted simultaneously. Further, the processes may be repeated plural times.

The dyeing can be effected at any period before monoaxial stretching, in monoaxial stretching and after monoaxial stretching, however an ethylene-modified PVA tends to manifest increase in the degree of crystallization and may reveal reduction in dyeing property by monoaxial stretching, therefore, it is preferable to conduct dying in any process preceding monoaxial stretching or in a monoaxial stretching process. As the dye used in the dying, dichroic dyes such as iodine-potassium iodide or; Direct Black 17, 19, 154; Direct Brown 44, 106, 195, 210, 223; Direct Red 2, 23, 28, 31, 37, 39, 79, 81, 240, 242, 247; Direct Blue 1, 15, 22, 78, 90, 98, 151, 168, 202, 236, 249, 270; Direct Violet 9, 12, 51, 98; Direct Green 1, 85; Direct Yellow 8, 12, 44, 86, 87; Direct Orange 26, 39, 106, 107, and the like can be used. Generally, dyeing is conducted by immersing a PVA film in a solution containing the above-mentioned dye, however, treatment conditions and treatment methods thereof are not particularly restricted.

For the monoaxial stretching, a wet stretching method or dry heat stretching method can be used, and it can be conducted in hot water (or in a solution containing the above-mentioned dye or in a fixing treatment bath described below) or in air using a PVA film after water absorption. From the standpoint of uniformity of optical characteristics, a roll stretching method utilizing difference in speed between rolls is most preferably used, however, an effect of improving uniformity of optical characteristics can be obtained even if the polyvinyl alcohol film of the present invention having a width of at least 2 m is used in other stretching method. The stretching ratio is preferably at least 4-times, and particularly preferably at least 5-times. When the stretching ratio is less than 4-times, practically sufficient polarization characteristic and durable characteristic can not obtained easily. Stretching may be conducted to the intended stretching ratio in one stage, however, neck-in decreases and an effect of uniformity of optical characteristics are obtained by stretching in two or more multi-stages. The stretching temperature is not particularly restricted, and when a PVA film is stretched in hot water (wet stretching), temperatures from 30 to 90° C. are suitable, and when dry heat stretching is conducted, temperatures from 50 to 180° C. are suitable. The thickness of a film after stretching is preferably from 3 to 75 μm, more preferably from 10 to 50 μm.

The fixing treatment is conducted for the purpose of rendering adsorption of the above-mentioned dye onto a polyvinyl alcohol film stronger. Into a treating bath used for the fixing treatment, boric acid and boron compound are usually added. If necessary, an iodine compound may also be added into the treating bath.

The drying treatment (heat treatment) of a polarization film is conducted at a temperature preferably from 30 to 150° C., more preferably from 50 to 150° C.

On a polarization film obtained as described above, a protective film optically transparent and having suitable mechanical strength is laminated on each surface or on one surface thereof to provide a polarizer to be used. As the protective film, cellulose acetate films, acrylic films, polyester films and the like are usually used.

EXAMPLES

The following examples illustrate the present invention specifically, but do not limit the scope of the present invention. Variance in thickness per unit mm along the TD direction described in examples and comparative examples was measured as described below.

Measurement of variance in thickness per unit mm along TD direction

Thickness profile along the TD direction of a film was measured at 5 positions at an interval of 1 m along the MD direction using a film thickness tester KG601A manufactured by Anritsu Corp., and the maximum value of variance in thickness per unit mm at any part along the TD direction was obtained.

Example 1

A film material having a volatile component factor of 63% by weight composed of 100 parts by weight of PVA having a degree of hydrolysis of 99.9 mol % and a degree of polymerization of 2400, 8 parts by weight of glycerin, 0.1 part by weight of lauric acid diethanol amide and water was discharged onto a metal drum having a diameter of 3.2 m plated with chromium at 90° C., and a film was formed. The die used in discharging the film material was a coat hanger type T die of flexible lip method. Further, the film material on the surface of the metal drum was dried with hot air of 80° C., to obtain a PVA film having a width of 3.4 m. The thickness of the resultant film was measured to find that the average thickness was 74 μm and the maximum value of variance in thickness per unit mm length along the TD direction was 0.15 μm/mm.

This PVA film was subjected to preliminary swelling, dyeing, monoaxial stretching, fixing treatment, drying and heat treatment in this order, to produce a polarization film. Namely, this PVA film was immersed in water of 30° C. for 3 minutes to effect preliminary swelling, and immersed in an aqueous solution of 40° C. having an iodine concentration of 0.4 g/liter and a potassium iodide concentration of 40 g/liter for 4 minutes. Subsequently, monoaxial stretching of roll method was conducted at 5.3 times in an aqueous solution of 50° C. having a boric acid concentration of 4%. Further, the film was immersed in an aqueous solution of 30° C. having an potassium iodide concentration of 40 μL and a boric acid concentration of 40 g/L for 5 minutes, to effect fixing treatment. The film was removed, and dried with hot air of 40° C. and further, heat-treated at 100° C. for 5 minutes, while maintaining the length constant. The resultant polarization film had a thickness of 26 μm, and no dyeing irregularity was recognized on this polarization film, and the resultant polarization film was sandwiched at an angle of 45° between two polarizers in cross nicol condition, and when the transmitted light was visually observed to find no streak irregularity, meaning excellent quality.

Example 2

A film material having a volatile component factor of 72% by weight composed of 100 parts by weight of PVA having a degree of hydrolysis of 99.9 mol % and a degree of polymerization of 4000, 13 parts by weight of glycerin, 0.1 part by weight of polyoxyethylene lauryl ether and water was discharged onto a metal drum as in Example 1 and a film was formed. The die used in discharging the film material was a coat hanger type T die of flexible lip method, Further, the film material on the surface of the metal drum was dried with hot air of 90° C., to obtain a PVA film having a width of 3.2 m. The thickness of the resultant film was measured to find that the average thickness was 76 μm and the maximum value of variance in thickness per mm along the TD direction was 0.1 μm/mm. Further, a polarization film having a thickness of 27 μm was obtained in the same manner as in Example 1 except that the stretching ratio was changed to 5.0-times. No dyeing irregularity was recognized on this polarization film, and the resultant polarization film was sandwiched at an angle of 45° between two polarizers in cross nicol condition, and when the transmitted light was visually observed to find no streak irregularity, meaning excellent quality.

Example 3

A film material having a volatile component factor of 78% by weight composed of 100 parts by weight of PVA having a degree of hydrolysis of 99.9 mol % and a degree of polymerization of 5500, 12 parts by weight of glycerin, 0.1 part by weight of polyoxyethylene lauryl ether and water was discharged onto a metal drum having a diameter of 2.5 m plated with chromium at 90° C., and a film was formed. The die used in discharging the film material was a coat hanger type T die of flexible lip method. Further, the film material on the surface of the metal drum was dried with hot air of 92° C., to obtain a PVA film having a width of 2.5 m. The thickness of the resultant film was measured to find that the average thickness was 72 μm and the maximum value of variance in thickness per mm along the TD direction was 0.3 μm/mm. Further, a polarization film having a thickness of 32 μm was obtained in the same manner as in Example 1 except that the stretching ratio was changed to 4.7-times. No dyeing irregularity was recognized on this polarization film, and the resultant polarization film was sandwiched at an angle of 45° between two polarizers in cross nicol condition, and when the transmitted light was visually observed to find no streak irregularity, meaning excellent quality.

Comparative Example 1

Drum film formation and drying were conducted under the same conditions and the same content as in Example 1 except that the surfactant was substituted by a cationic surfactant, lauryltrimethylammonium chloride, to obtain a PVA film having a width of 3.4 m. The thickness of the resultant film was measured to find that the average thickness was 75 μm and the maximum value of variance in thickness per mm along the TD direction was 0.9 μm/mm. Further, a polarization film having a thickness of 28 μm was obtained in the same manner as in Example 1 except that the stretching ratio was changed to 4.9-times. Dyeing irregularity including dense portions in the form of streaks present along the MD direction was recognized on this polarization film, and the resultant polarization film was sandwiched at an angle of 45° between two polarizers in cross nicol condition, and when the transmitted light was visually observed to find a defect in the form of significant optical streaks, meaning poor quality.

Comparative Example 2

Drum film formation and drying were conducted in the same manner as in Example 1 except that the volatile component factor was changed to 84% by weight and the die used in discharging the film material was changed to a coat hanger type T die of choke bar method, to obtain a PVA film having a width of 3.3 m. The thickness of the resultant film was measured to find that the average thickness was 74 μm and the maximum value of variance in thickness per mm along the TD direction was 0.7 μm/mm. Further, a polarization film having a thickness of 29 μm was obtained in the same manner as in Example 1 except that the stretching ratio was changed to 5.0-times. Dyeing irregularity including pale portions in the form of streaks present along the MD direction was recognized on this polarization film, and the resultant polarization film was sandwiched at an angle of 45° between two polarizers in cross nicol condition, and when the transmitted light was visually observed to find significant optical streaks, meaning poor quality.

Comparative Example 3

The same film material as in Example 1 was discharged onto a belt controlled in an atmosphere of 85° C., and belt film formation was conducted. The die used in discharging the film material was a coat hanger type T die of flexible lip method. The resultant PVA film had a width of 2.4 m, an average thickness of 74 μm and a maximum value of variance in thickness per mm along the TD direction of 0.5 μm/mm. However, a joint was present on the center part of the belt used in this example, and when this PVA film was lifted before a white board in a dark room and projected by a projector, to observe optical streaks supposed to be transfer of the joint of the belt, on the center part of the PVA film. This PVA film had poor quality, therefore, the quality of this polarization film could not be evaluated.

Example 4

A film material having a volatile component factor of 60% by weight composed of 100 parts by weight of PVA having a degree of hydrolysis of 99.9 mol % and a degree of polymerization of 1700, 15 parts by weight of glycerin, 0.1 part by weight of lauric acid diethanol amide and water was discharged onto a metal drum having a diameter of 3.2 m plated with chromium at 92° C., and film was formed. The die used in discharging the film material was a coat hanger type T die of flexible lip method. Further, the film material on the surface of the metal drum was dried with hot air of 90° C., to obtain a PVA film having a width of 3.2 m. The thickness of the resultant film was measured to find that the average thickness was 75 μm and the maximum value of variance in thickness per mm along the TD direction was 0.2 μm/mm. Further, a polarization film having a thickness of 33 μm was obtained in the same manner as in Example 1 except that the stretching ratio was changed to 4.4-times. No dyeing irregularity was recognized on this polarization film, and the resultant polarization film was sandwiched at an angle of 45° between two polarizers in cross nicol condition, and when the transmitted light was visually observed to find no streak irregularity, meaning excellent quality.

Comparative Example 4

The same film material as in Example 4 was discharged onto a metal drum having a diameter of 3.2 m plated with chromium at 95° C., and film was formed. The die used in discharging the film material was a coat hanger type T die of flexible lip method. Further, the film material on the surface of the metal drum was dried with hot air of 95° C., to obtain a PVA film having a width of 1.8 m. The thickness of the resultant film was measured to find that the average thickness was 182 μm and the maximum value of variance in thickness per mm along the TD direction was 0.3 μm/mm. Further, a polarization film having a thickness of 28 μm was obtained in the same manner as in Example 1 except that the stretching ratio was changed to 4.7-times. Dyeing irregularity ascribed to stretching irregularity was recognized on this polarization film, and the resultant polarization film was sandwiched at an angle of 45° between two polarizers in cross nicol condition, and when the transmitted light was visually observed to find optical streak irregularities on the whole surface, meaning poor quality. The various conditions of Examples 1 to 4 and Comparative Examples 1 to 3 are summarized in Table 1.

TABLE 1

| | Film material | | | | PVA film | | | | |
|---|---|---|---|---|---|---|---|---|---|
| | Degree of polymerization of PVA | Volatile component factor (% by weight) | Film formation method | Drum diameter (m) | Average thickness (μm) | Width (m) | Maximum value of variance in thickness (μm/mm) | Quality of polarizer Optical streak irregularity | Remarks |
| Example 1 | | | Drum | 3.2 | | | | | |
| Example 2 | 2400 | 63 | Drum | 3.2 | 74 | 3.4 | 0.15 | Excellent | |
| Example 3 | 4000 | 72 | Drum | 2.5 | 76 | 3.2 | 0.1 | Excellent | |
| Example 4 | 5500 | 78 | Drum | 3.2 | 72 | 2.5 | 0.3 | Excellent | |
| Comparative Example 1 | 1700 | 60 | Drum | 3.2 | 75 | 3.2 | 0.2 | Excellent | Cationic surfactant was added. |
| Comparative Example 2 | 2400 | 63 | Drum | 3.2 | 75 | 3.4 | 0.9 | Poor | Streaks were generated along the TD direction, and when a polarizer was made, optical streaks accompanying |
| Comparative Example 3 | 2400 | 84 | Belt | — | 75 | 3.3 | 0.7 | Poor | A joint at the center part of a belt was transferred to a film, and optical streaks were generated. |
| Comparative Example 4 | 2400 | 63 | Drum | 3.2 | 74 | 2.4 | 0.5 | Poor | Stretching irregularity occurred. |

Although the present invention has been fully described in connection with the preferred embodiments, those skilled in the art will readily conceive of numerous changes and modifications within the framework of obviousness upon the reading of the specification herein presented of the present invention. Accordingly, such changes and modifications are, unless they depart from the scope of the present invention as delivered from the claims annexed thereto, to be construed as included therein.

What is claimed is:

1. A method of making a polyvinyl alcohol film, which comprises the steps of:

preparing a film material containing polyvinyl alcohol, 0.01 to 1 part by weight of a nonionic surfactant relative to 100 parts by weight of the polyvinyl alcohol, and water, said film material having a volatile component in a quantity within the range of 50 to 90% by weight; and discharging the film material from a die of a flexible lip system onto a surface of a drum to form a polyvinyl alcohol film on said drum surface;

wherein said polyvinyl alcohol film has a thickness within the range of 20 to 150 μm and also has a width of at least 2 m, a variance of said film thickness along the transverse direction being 0.5 μm/mm or less.

2. The method according to claim 1, wherein the film material is discharged onto the surface of the drum, which is plated with chromium, to thereby form the polyvinyl alcohol film.

3. The method according to claim 1, wherein the variance in thickness along the transverse direction of the film is 0.28 μm/mm or less.

4. The method according to claim 1, wherein the thickness of the film is within the range of 40 to 120 μm.

5. The method according to claim 1, comprising further processing the polyvinyl alcohol film to make a polarization film, wherein said further processing comprises subjecting the polyvinyl alcohol film to at least one of dyeing, monoaxial stretching, fixing treatment and drying treatment, in any order or simultaneously, one or more times.

* * * * *